Sept. 4, 1956 A. GOETZ 2,761,813
MEANS AND METHOD OF PRODUCING AND CONTROLLING
CULTURES OF MICROORGANISMS
Filed Jan. 21, 1953 2 Sheets-Sheet 1
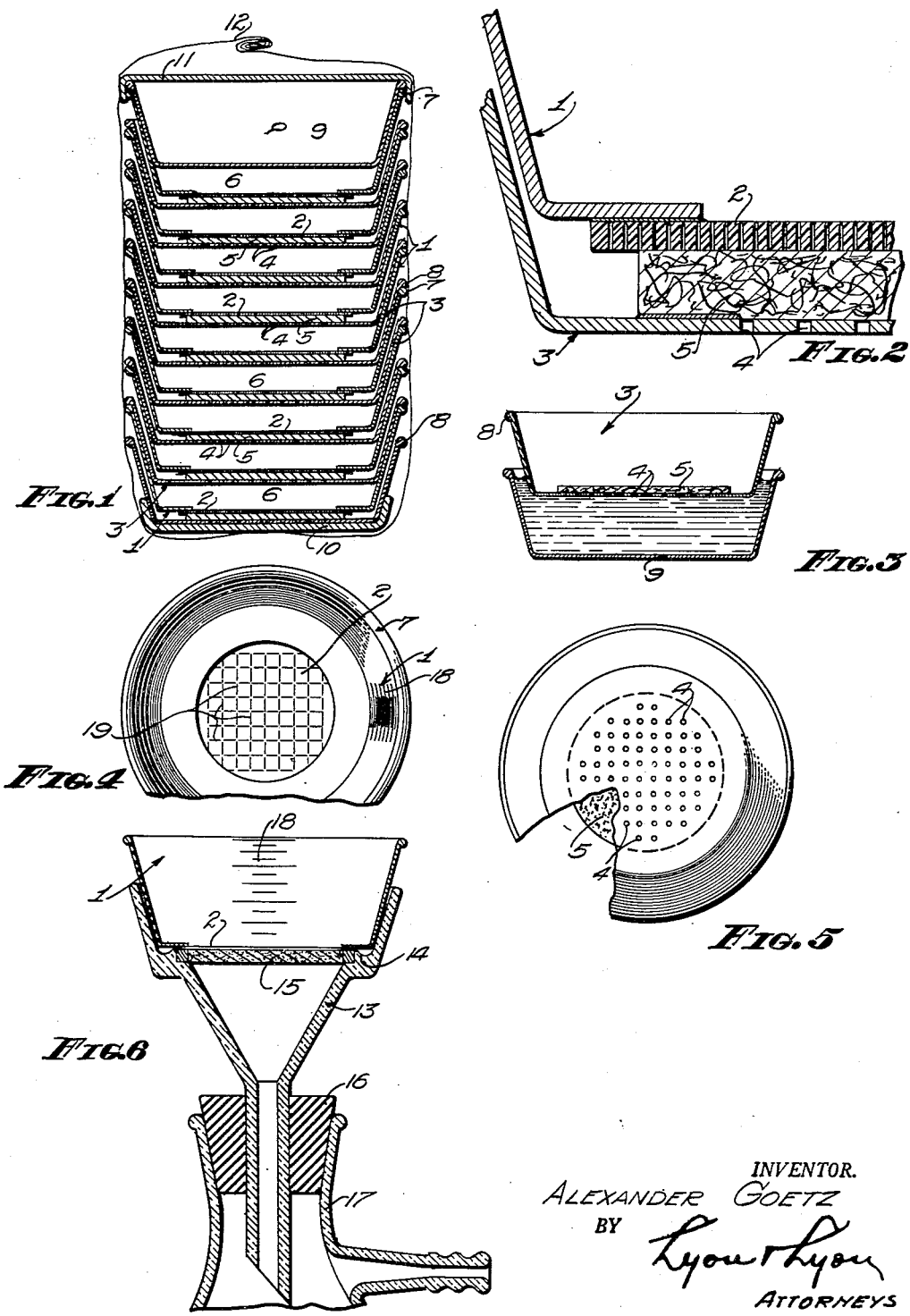
INVENTOR.
ALEXANDER GOETZ
BY
Lyon & Lyon
ATTORNEYS Sept. 4, 1956  A. GOETZ  2,761,813
MEANS AND METHOD OF PRODUCING AND CONTROLLING
CULTURES OF MICROORGANISMS
Filed Jan. 21, 1953  2 Sheets-Sheet 2
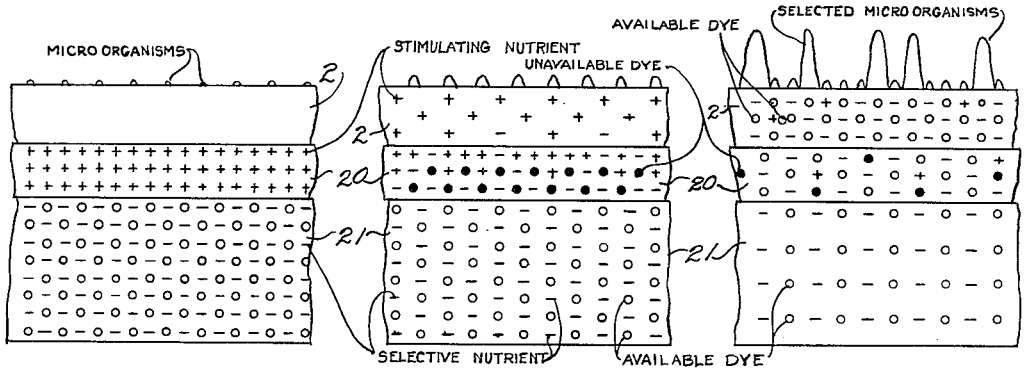
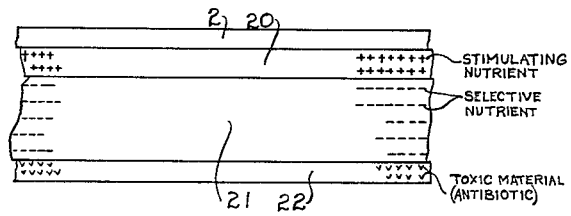
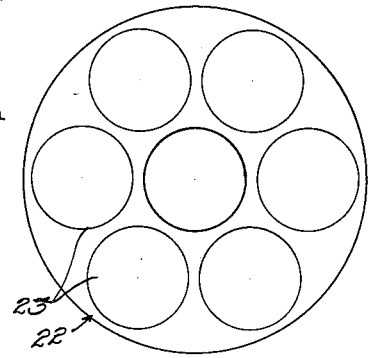
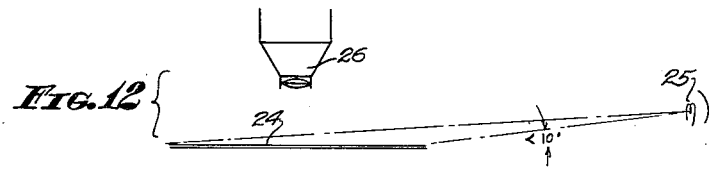
INVENTOR.
ALEXANDER GOETZ
BY
*Lyon & Lyon*
ATTORNEYS United States Patent Office 2,761,813
Patented Sept. 4, 1956

2,761,813
MEANS AND METHOD OF PRODUCING AND CONTROLLING CULTURES OF MICROORGANISMS

Alexander Goetz, Altadena, Calif.

Application January 21, 1953, Serial No. 332,288

18 Claims. (Cl. 195—80)

My invention relates to means and method of producing and controlling cultures of microorganisms and the objects of my invention are:

First, to provide a means and method of producing cultures of microorganisms which is applicable to all types of microbiological investigations, whether simple, routine, or complex and extensive, and whether concerning bacteria, yeasts, fungi, or other microorganisms capable of growth.

Second, to provide a means and method of this class which virtually eliminates the excessive amount of laboratory equipment, particularly glassware, and the attendant problems of sterilization of such equipment.

Third, to provide a means and method of this class wherein the laboratory labor is drastically reduced and simplified so that relatively unskilled persons may conduct even involved investigations concerning microorganisms in far less time and sterile equipment with more dependable results than have been possible heretofore.

Fourth, to provide a means and method of this class which is particularly suited for investigations of microorganisms made necessary by disaster or warfare, in that the necessary information can be obtained without a laboratory and at an earlier time, to permit effective counter measures.

Fifth, to provide a means and method of this class wherein special kits and nutrient media may be prefabricated by carefully controlled methods of mass production, then sterilized and stored for months or years until needed, such kits containing all the components necessary to conduct a particular investigation or test.

Sixth, to provide a means and method of this type which utilizes a microporous membrane capable of collecting microorganisms on its surface, and special nutrient pads or membranes placed under the microfilter in wetting contact to feed the microorganisms.

Seventh, to provide a means and method of producing cultures of microorganisms whereby the nutrients, inhibitors, antibiotics, or other substance intended to grow, selectively inhibit or kill the microorganisms may be fed automatically in a predetermined sequence and in precisely the desired amounts so that the results obtained may be depended upon to be accurate and complete.

With the above and other objects in view as may appear hereinafter, reference is directed to the accompanying drawings in which:

Figure 1 is a sectional view showing an assembly or packet incorporating my invention.

Figure 2 is an exaggerated and diagrammatic sectional view showing one of the units for producing biological cultures.

Figure 3 is a sectional view of one of the nutrient units illustrating the manner in which the nutrient pad is supplied with the quantity of water required for uniform rehydration.

Figure 4 is a fragmentary plan view of one of the filter cups employed in my invention.

Figure 5 is a bottom view of one of the nutrient cups.

Figure 6 is a fragmentary sectional view of a filter cup and associated apparatus employed to draw a liquid sample through the filter cup.

Figures 7, 8 and 9 are fragmentary diagrammatic sectional view of a filter membrane and nutrient pad in which the nutrient pad is laminated and its component laminae provided with different growth control media.

Figure 7 illustrates the initial conditions existing at the time the filter membrane and nutrient pad are brought into contact.

Figure 8 illustrates an intermediate condition.

Figure 9 illustrates a final condition.

Figure 10 is another fragmentary diagrammatic sectional view illustrating another type of laminated nutrient pad.

Figure 11 is a plan view of another of the laminae of the nutrient pad illustrating the manner in which several growth control media or test substances may be applied to laminae components of the pad.

Figure 12 is a diagrammatical view showing a typical arrangement facilitating early detection of microorganisms or the effect of inhibitors thereon.

Reference is first directed to Figures 1–5, which illustrate devices employed to perform my method of producing bacteriological cultures.

In order to conduct a bacteriological investigation a set of sterile filter cups 1 is employed. Each filter cup may be formed of paper or other inexpensive expendable material. Each filter cup has a tapered side wall and a flat bottom which is cut out, leaving a marginal flange. Cemented and sealed by its periphery to the under side of the filter cup is a microfilter membrane or molecular filter membrane 2.

A filter membrane found suitable for the purposes of my invention consists of a homogenous screen-like rigid cellulose or cellulose ester film devoid of any fibrous structure and of a highly uniform porosity (80% to 90%), and having almost complete wet-dry stability. Such membrane now available has a large number ($10^8$/cm.$^2$) of fine pores which permit quantitative surface retention of bacterial forms at flow rates of 100 ml./cm.$^2$/min. While the exact structure of the filter membrance cannot be determined with accuracy, it has been established that it is anisotropic; that is, liquids move preferentially normal to the surfaces of the membrane with only minor lateral diffusion. Also, the pore diameters are smallest at the upper surface and the upper surface is quite smooth so that the bacteria or other microorganisms retained do not penetrate into the membrane but lie on the surface. For the purposes of this invention the filter membrane per se may be considered as conventional; however, its combination with the other elements of my invention does constitute a part of my present invention.

As a companion to the filter cup 1 there is provided a sterile nutrient cup 3, also formed of paper or similar expendable material. The nutrient cup has diverging side walls; the bottom is flat and perforated as indicated by 4. Cemented by its marginal portion to the perforated bottom of the nutrient cup is a nutrient pad 5, which is formed of absorbent material, such as a heavy blotting paper.

The nutrient pad, before or after attachment to the nutrient cup, is impregnated with a nutrient solution of predetermined quantity and concentration.

The nutrient pad is a sheet or disk of uniform thickness and formed of uniformly porous material, such as a blotting paper, filter paper and the like. The nutrient pad should be chemically neutral and except for special purposes hereinafter described, should have no selective adsorptive quality. For some purposes the nutrient pad may be isotropic; i. e., the water or other liquid diffuses or migrates in all directions equally. For other purposes the nutrient pad is anisotropic, confining movement of the liquid normal to the surfaces of the pad with minimal lateral diffusion. Thus, for some purposes, a microfilter membrane or a modification thereof may be used.

The term "nutrient," as herein used, is intended to designate any substance which may be fed to the microorganism; thus, it may be a growth-promoting or a partially growth-inhibiting substance. A solution of nutrient is absorbed by the pad and the pad is then dehydrated and sterilized under precautions avoiding denaturation of the nutrient. The quantity as well as the quality of the nutrient can be held to close tolerances.

Many nutrients are conventionally employed in bacteriological studies or studies of other microorganisms. They may be simple or complex mixtures designed for specific purposes, and often contain selective inhibiting agents for certain types of microorganisms; thus, the conventional nutrient formulas number in the hundreds or thousands. For the purposes of the present invention the nutrients per se, or more broadly the growth controlling substances per se, whether nutritive or inhibitory in nature, may be considered as conventional. However, as an element or elements of my combination the nutrient pad, or various arrangements of said nutrient pad, and the concept of an automatic nutrient schedule, as hereinafter set forth, are part of my present invention.

The nutrient cup and filter cup are so proportioned that the filter cup sets in the nutrient cup with its microfilter membrane in uniform contact with the nutrient pad as shown in Figure 2. The nutrient cups may be so arranged that they will nestle partially into the filter cups so as to form an air space 6 of predetermined volume. This may be accomplished by providing rolled edges 7 and 8 around the rims of the filter cups and nutrient cups, respectively, to form shoulders or stops as shown in Figure 1.

Prior to use the nutrient pad is rehydrated with the desired quantity of water merely by floating the nutrient cup on the surface of a quantity of sterile water as suggested in Figure 5.

The perforations in the bottom of the nutrient cups are of such number and size that the water will be transferred uniformly over the area of the nutrient pad without appreciable transverse flow within the boundaries of the pad so that the concentration of the nutrient will remain uniform throughout the pad.

Since the capillary volume capacity of the pad is limited, the pad will take up a defined quantity of water; thus, there is no need to measure the water volume required for rehydration and for producing the optimal nutrient concentration.

A sterile cup 9 similar to the nutrient or filter cups, that is, made of paper of similar expendable material, may be employed as a container for the distilled water required for rehydration.

It should be observed that the manufacture of the microfilter membrane can be so controlled, that upon wetting the membrane, it can be caused to either shrink or expand slightly. For the purposes of my invention it is desirable that the microfilter membrane shrink slightly on being wetted so that when brought in contact with the nutrient pad it will not buckle or warp, but instead be in uniform wetting contact over its entire area.

During storage the filter cups and nutrient cups may be stacked alternately as shown in Figure 1. The bottom of the lowermost nutrient cup is preferably protected by a rigid base member 10 having a marginal flange. The water cup 9 may be the uppermost cup contained in the stack. The water cup, being of the same dimensions as the nutrient cup, will form the desired uniform air space 6 above the uppermost filter cup. A cap or cover 11 having a marginal flange fits over the water cup. The entire stack of cups is sealed in a bag 12.

The bag 12 may be formed of polyethylene or another plastic film impermeable to moisture but permeable to ethylene oxide or formaldehyde, to permit sterilization after assembly. The reinforcing base member 10 and cover 11 protect the kit against crushing. Initially the kit comprising the stack of filter cups and nutrient cups, together with the water cup, is sealed in the bag 12 and sterilized.

In conducting an investigation of microorganisms the filter cups are seated, one at a time, in a filter funnel 13, as shown in Figure 6. The funnel is provided with a shoulder 14. Seated in the shoulder is a porous supporting disk 15 which may be in the form of a porous plate of fritted coke, glass, metal or the like; that is, any porous material which provides adequate support for the microfilter membrane. The stem of the funnel 13 may extend through a stopper 16 into a flask 17, which is adapted to be connected to a source of vacuum pressure. It should be noted that the construction of funnel and filter cup provides for a tight seal at 14 so that a vacuum in the flask will cause the fluid in the cup to pass quantitatively through the membrane. The filter cup may serve as a means of measuring the quantity of liquid to be passed through the filter membrane. For this purpose graduations 18 may be printed on the wall of the filter cup.

The microorganisms are retained on the top surface of the microfilter. It is of course desirable that the number of microorganisms collected be within an optimum range in order that a dependable count may be made. Thus the quantity of water or other liquid to be tested is regulated accordingly, or if the microorganisms are excessive, the liquid is suitably diluted with sterile water.

The nutrient pad is wetted as shown in Figure 3 and the corresponding microfilter membrane is placed on top as shown in Figure 2. As pointed out before, care is taken to provide wetting contact between the lower surface of the microfilter membrane and the nutrient pad throughout their areas.

It will be observed that the arrangement of the various elements of my apparatus is such that at any time during the operation the sterility of the equipment by handling is assured, i. e., it is unnecessary to take special precautions for aseptic handling.

After the bacteria have been collected on the membrane surface in the filter cup, and the former has been brought in wetting contact with the rehydrated nutrients in the nutrient cup, the pairs of cups are restacked and have an air space between the surface of the membrane and the bottom of the next nutrient cup, sufficient for the growth of the microorganisms.

After the microorganisms have been collected on the series of microfilter membranes and these membranes have been restacked on their respective nutrient pads, the entire kit may be returned to the bag 12 and then subjected to incubation at the desired temperature. It will be observed that all of the factors necessary for growth of the microorganisms may be controlled with a high degree of accuracy; that is, the quantity of nutrient, the quantity of moisture and the volume of air are all uniform.

In order to facilitate counting the colonies of microorganisms after incubation, the microfilter membranes may be prepared with a printed grid 19 as shown in Figure 4, the squares of which bear some simple numerical relation to the area of the microfilter exposed to filtration.

In Figures 1-5 a nutrient pad has been illustrated which has only one component, that is, one porous leaf. The nutrient pad may, however, be made to have more than one component in order to provide automatically a timed sequence or "schedule" of more than one nutrient formula to the microorganisms on the membrane surface. Purpose and utility of a scheduled feeding of nutrients may be illustrated by the following example:

In sanitary water tests it is customary to culture bacteria contained in a water sample by the addition of nutrients which inhibit the development of the majority of the microflora except those which are originating from sewage. This group, known as E. coli, is related also to certain other bacterial groups such as B. aerogenes. These groups all can be nutriated by lactose and are least sensitive to certain dyes such as fuchsine, brilliant green, etc. Nutrient pads designed for the selective nutrition of the coli-aerogenes group would thus contain in suitable concentration lactose in addition to other components as nutrient, and a dye, e. g., fuchsine, as the inhibiting factor for the development of the rest of the bacterial flora in the water sample.

It is also known that the application of this nutrient-dye combination to such bacteria when deposited by filtration on a microfilter membrane can produce an insufficient or even no growth development on the membrane, apparently because the inhibitory dye affects the less viable bacteria, though of the coli-aerogenes type, adversely during the early stages of development on the membrane. The final count may thus be misleadingly small or entirely fail to indicate the presence of these bacteria.

This disadvantage can be avoided by contacting the membrane for the first two or three hours of its growth development during incubation with a nutrient pad which does not contain the dye but rather a nutrient formula of highly stimulating composition, able to bring even weakened bacterial cells into the logarithmic growth phase wherein the viability is high and the tolerance for the differentiating dye is substantially increased. The membrane, after this stage is reached, is then transferred to another nutrient pad which contains the nutrient and the dye, which latter inhibits further growth on all but the aforementioned bacteria. It has to be realized that the size of bacterial colonies increases exponentially with time so that the size of the colonies of those bacteria which are inhibited by the transfer to the second nutrient pad has, after two or three hours, not reached into an order of magnitude visible by subsequent counting methods. Errors in counting due to the presence of even a large number of subsequently inhibited colonies do not occur if the transfer to the second nutrient pad is not effected too late.

This method has, especially for large scale routine operation, the disadvantage of requiring an additional manipulation of the membrane due to the transfer from one nutrient pad to another. This transfer involves exposure of the culture and thus possible additional contamination, and may cause severe growth retardation by partial drying, if not expertly handled.

This difficulty may be avoided by converting the operation of transfer into an automatic nutrient schedule effected by the use of a laminated nutrient pad consisting in this case of two separate component leaves as schematically represented in Figures 7–9. The upper pad 20 contains for this specific application to the coli-aerogenes group a generally stimulating lactose (or dextrose)—peptone nutrient; the lower pad 21 of larger liquid capacity contains a lactose-peptone nutrient with fuchsine as inhibitor. Both leaves are separately impregnated and subsequently dehydrated, and finally attached to each other to form one unit.

Furthermore, the material constituting the upper pad has the property of sorbing the dye up to a certain quantity without releasing it subsequently, in other words, the upper pad has the capacity for eliminating the dimolecules from the solution yielded by the lower pad and rendering the dye temporarily unavailable to the membrane 2. Figure 7 indicates the initial situation prior to hydration, where the membrane 2 carries on its surface the retained bacterial cells from the preceding filtration of the sample, the upper pad 20 the components of the stimulating nutrient (+), the lower pad 21 the lactose nutrient (−) and the inhibitory dye (o).

Upon contact with sterile water by the lower side of the pad 21 as described above, and upon contact between 2, 20 and 21 the results schematically shown in Figure 8 take place: the water taken up by 21 brings its components (−o) into solution. This initial solution, due to capillary action, reaches gradually into the upper laminate 20 where it dissolves in addition the nutrient components (+) contained therein. However, due to the sorptive qualities of 20, the dye component (o) originating from 21 is removed from the solution and rendered unavailable, as indicated by (ō), as it appears at the interface between 2 and 20. The membrane 2, having smaller capillaries than the nutrient pad components, removes the top layer of this solution from 20 and lifts it to its upper surface where the solution reaches the bacteria. They are thus contacted with a highly stimulating nutrient in the absence of the dye and begin to grow.

As the microorganisms metabolize gradually, the so conditioned nutrient has to diffuse upward in order to maintain an equilibrium in the assembly. As a consequence, the components supplied by 20 will gradually become exhausted and so will be the adsorptive capacity for the dye. The latter will pass now in an available state from 21 through 20 into 2 and a gradual change of nutrient composition will affect the growth of bacteria. The initial general stimulation will be replaced by selective growth inhibition and growth nutrition of lactose fermenters capable of resisting the dye. This final stage of nutrition, reached in the final phases of incubation, is schematically shown in Figure 9.

The time at which this state will be reached will depend upon: (a) the relative liquid capacity of the materials forming the leaves 20 and 21; (b) the diffusion rate through these materials; (c) the initial concentration of solutes in 20 and 21 respectively; (d) the sorptive capacity for the dye applied and, if any, of the membrane material. All these variables can be controlled by the thickness and type of material of the nutrient pad laminate components and the concentration of nutrients initially applied prior to dehydration.

The use of such preimpregnated dehydrated sterile nutrient pads will effect several economies: the operating laboratory does not have to prepare nutrients; the operator does not have to manipulate liquid nutrients in the field, thus avoiding the ever present danger of accidental contamination and misleading results; also a timed nutrient schedule, if prefabricated, is accurately reproducible, provided that the main factor which controls the diffusion and adsorption rate, that is to say, the incubation temperature, is closely maintained. The main saving, however, consists in the practically complete avoidance of the requirement for sterile glassware.

In the above specific example, the upper laminate component acted in a twofold manner, for it added stimulating nutrients to the solution from the other pad and it subtracted certain inhibitory components temporarily. I do not wish to restrict my invention to a combination of simultaneous additive and subtractive performances. In order to illustrate the utility of a strictly additive performance of the upper laminate, I refer to the following example:

In certain clinical, diagnostic test performances, one aims at the earliest possible identification of one or more of a whole group of selectively antibiotic agents (sulfanilamides, pencillin, aureomycin, etc.) which will inhibit the growth of the flora derived from the patient, in order to be able to resort to the proper chemotherapy even before the detailed identification of the pathogenic organism has been possible. For this purpose one can impregnate all or part of the upper laminate of the nutrient pad with one or several solutions of different antibiotics in such a manner that the additional agents are restricted to certain fractional areas of the top laminate. In this case it may be desirable to use, as a material for such a laminate, a leaf characteristized by a high diffusion rate normal and a low diffusion rate parallel to the surface of the leaf.

When the nutrient in the lower leaf is rehydrated and passes through the upper laminate, it dissolves, in analogy to the former example, the (antibiotic) components and carries to the microorganism a thus modified nutrient. Consequently a bacterial growth will occur on the upper surface of the membrane only in those regions where an antibiotic had been added to the nutrient which did not affect the particular microorganisms in question. Correlating the various types of antibiotics with the fractional areas in the upper laminate which carry different antibiotics can very simply be effected by a system of markings on the filter membrane which define the relative position of the filter membrane and the nutrient pad laminate during incubation.

It will be noted that in the above example—contrary to the previous one—the selective inhibitor (antibiotic) was added to the nutrient locally during the initial nutritional phase, while in the first example, the selective inhibitor was added in a delayed manner, that is, at a later stage in the growth phase.

I wish to include in my invention another principle resulting in a delaying action especially when an addition is required towards the end of the growth phase, that is, after sixteen to twenty-four hours. The utility of effecting such a delay is manifold. It may be desirable to stop further growth development after a given time of incubation, in which case a general bacterial poison (phenol, mercurous or silver compounds) should be released, inhibiting any further growth whatsoever on the membrane. It may also be desirable for the purpose of identification to release certain of such growth inhibitory dyes which act as pH or redox indicators and permit the differentiation of the bacterial colonies on the membrane by characteristic color reactions while the initial presence of such indicators in the concentrations required would be partially or totally growth inhibiting.

This result can be accomplished in the following manner: the agent is dissolved in a solution of an organocolloid such as gelatin, agar, carboxymethylcellulose, and one laminate is impregnated with this solution and subsequently dehydrated. The agent (provided that a suitable concentration ratio between the organocolloidal-solute and the agent existed) will be encapsulated into the colloid after dehydration. Upon rehydration, a substantial period of swelling, etc., will be necessary before the agent becomes available for diffusion into the surface of the filter. By the proper choice of the colloid and the aforementioned concentration ratio, a delaying action reaching over days if necessary, can be accomplished. Another application of the same delaying principle consists in casting a film of the combination of the organosol and the agent which is subsequently dehydrated similar to the gelatin films used in the formation of photographic emulsions. After drying, this film may then be used as a third laminate component.

I wish also to state as part of my invention that a sequence of impregnations of a nutrient pad leaf first with the organosol containing the agent, subsequent dehydration of same and subsequent impregnation of the same nutrient pad with an aqueous solution of nutrients without retarding colloids followed by immediate dehydration of the second impregnation can produce similarly an automatic delaying action, in which case the nutrient solution will be immediately available upon rehydration, whereas the delaying agent begins to condition the nutrient solution much later, in spite of the coexistence of the two agents in the same nutrient pad.

Still further, the colloid containing the selected agent may be formed in a moisture-permeable film and placed at the top or bottom of the nutrient pad.

In the examples given, two laminations are indicated; however, if more elaborate feeding schedules are desired, for purposes of particular investigations, three or more laminations might be employed. By way of example, reference is directed to Figure 10. In many investigations of microorganisms it is not only desirable to isolate as completely as possible a particular species of microorganisms but to determine what poison is most effective against the microorganism in question. For example, it may be desired to determine which antibiotic is most effective against a particular bacterial species, even though the species is not identified.

By adding a third lamination 22 such a test may be made automatically. The third lamination may be impregnated or printed with an antibiotic, thus the nutrient schedule initially follows the course indicated in Figures 7, 8 and 9 and terminates with the upward diffusion of the antibiotic, represented by check marks, to the surface of the microfilter.

It has been found, by control of the thickness and porosity of the laminations of the nutrient pad as well as the concentrations of the nutrients, inhibitors or the like, that any desired predetermined nutrient schedule can be provided. It thus follows that a reliable survey can be conducted by a person having no technical knowledge as long as simple instructions are followed.

So far in considering the nutrient pad, whether a single number or laminated, it has been considered as isotropic, that is, permitting movement of liquid therein either laterally or parallel to its surfaces and vertically or normal to its surfaces. For many purposes it is desirable to utilize an anisotropic nutrient pad or an anistropic lamination of such pad; that is, to confine the movement of liquid therethrough to flow normal to its surfaces with no appreciable lateral diffusion. It will be noted that this is a characteristic of the microfilter itself.

If such a pad or lamination is used, it is possible to subject different areas of the microfilter to different agents and, in effect, enable one microfilter membrane to serve the place of several membranes, with the very great advantage of maintaining conditions exactly equal except for the precise variable that is to be investigated.

For example, if in Figure 10 the laminations were anisotropic, the lowermost lamination might be imprinted with several antibiotics as represented by the circular areas 23 in Figure 11. After completion of incubation of the microorganisms collected on the microfilter, it will be readily apparent which of the selected antibiotics is most effective. While an antibiotic test is selected as an example, it is of course understood that any other selected series of test substances may be similarly used.

It of course is not necessary that the multiple imprinted or treated lamination be the bottom one. Any or all the others may be similarly prepared. In many cases it is preferred to so prepare the upper lamination. Again selecting antibiotics as an example, the uppermost lamination may be imprinted or treated as indicated in Figure 11. The nutrient common to all areas of the antibiotic treated lamination is conditioned differently in the different areas, making possible an early determination of which antibiotic to use.

The importance of early determination cannot be overemphasized for the reason that microorganisms develop in number logarithmically. Thus in the case of a patient with an infectious disease, the earlier the proper countermeasure can be determined the better. Without knowing the identity of the microorganism, its susceptibility to a large number of antibiotics may be determined in a remarkably short time, by microscopic examination of the microfilter membrane before the microorganisms have been fully incubated.

It should be observed that if a delayed supply of a particular series of agents is desired, the multiple imprinted lamination may be employed in conjunction with the different methods of use previously described; that is, the selective sorption, or delayed solution techniques may be used.

While the foregoing examples have dealt principally with "bacteria," it should be observed that my means and method are not limited to the development of bacteriological cultures only but are equally adapted to the study of fungi, molds, virus, bacteriophages and any other microorganisms capable of retention on the microfilter.

In this regard it should be observed that the smaller virus and bacteriophages are sufficiently small to pass through even the microfilter. They may be entrapped, however, by first passing through a filter a solution containing larger bacteria or other microorganisms which serve as a host to the virus or bacteriophage in question. A thin "filter cake" of such bacteria is collected on the membrane, then the solution containing the virus or bacteriophage is drawn through. It is found that the virus or bacteriophage will be retained by the bacteria filter cake. A nutrient schedule is applied in the manner analogous to that hereinbefore described. Detection and analysis of the virus or bacteriophage is made by observation of the voids produced in the bacteria filter cake.

It will be observed that the upward movement of the nutrient substance, as described hereinbefore, is a chromatographic action. However, the timing of the nutrient schedule may be controlled by use of substances which dissolve or return to solution at different rates; for example, water soluble carboxymethylcelluloses of different concentrations return to solution at different rates.

Again referring to the technique, wherein antibiotics or analogous substances are incorporated in the lamination immediately adjacent the microfilter, or, for that matter in the microfilter itself, a procedure whereby early detection may be made involves means indicated diagrammatically in Figure 12.

First, it should be observed that initially at least the microorganism growth is essentially two-dimensional, i. e., along the surface of the microfilter. Now, if the surface of the microfilter membrane 24 is dyed black, preferably nonfluorescent, the very early stages of growth (or lack of growth) may be determined by directing a low angle beam of light 25 across the surface of the microfilter. The colonies of microorganisms become quite distinct as light scattering dots which may be observed by eye or by a microscope 26.

Not only does the technique enable detection at an extremely early stage, but it also permits repeated or continuous examination of the microorganisms during their development, including photographing without interfering with their development.

Having fully described my invention, it is to be understood that I do not wish to be limited to the details herein set forth, but my invention is of the full scope of the appended claims.

I claim:

1. A microorganism culture producing means, comprising: a filter cup having a microfilter membrane forming the bottom thereof; a nutrient cup having a nutrient impregnated disk of absorbent material forming the bottom thereof; said filter cup adapted to nestle in the nutrient cup with its undersurface in wetting contact with the upper surface of said nutrient pad.

2. A microorganism culture producing means, comprising: a filter cup having a microfilter membrane forming the bottom thereof; a nutrient cup having a nutrient impregnated disk of absorbent material forming the bottom thereof; said cups having tapered side walls and adapted to be stacked alternately, said cups being so proportioned that each filter cup is adapted to nestle within a corresponding nutrient cup with its filter membrane in wetting contact with the surface of said nutrient pad; said nutrient cups adapted to nestle only partially into said filter cups whereby said nutrient pads are spaced from the filter pad below to form an atmospheric region thereabove of predetermined volume.

3. A microorganism culture producing means, comprising: a porous microfilter membrane having an upper surface adapted to retain microorganisms; at least a pair of absorbent members, said members being impregnated with different soluble substances adapted to affect the growth of microorganisms; said members adapted to be wetted and placed in wetting contact with each other and the side of said microfilter membrane opposite from its microorganism retaining surface, and cause the migration of said substances in sequence through said microfilter to said microorganisms.

4. A microorganism culture producing means, comprising: a porous microfilter membrane having an upper surface adapted to retain microorganisms; a lamination of absorbent members, each of said members being impregnated with a different microorganism growth controlling substance soluble in water; said lamination of absorbent members adapted to be wetted and placed in wetting contact with the side of said microfilter opposite from said microorganisms, whereby said substances are supplied in sequence to said microorganisms.

5. A microorganism culture producing means, comprising: a porous microfilter membrane having an upper surface adapted to retain microorganisms; a lamination of absorbent members, each of said members being impregnated with a different microorganism growth controlling substance soluble in water; said lamination of absorbent members adapted to be wetted and placed in wetting contact with the side of said microfilter opposite from said microorganisms, whereby said substances are supplied in sequence to said microorganisms; one of said members being impregnated with a substance toxic to a selected class of microorganisms thereby to determine the resistance of the selected microorganisms to said toxic substance.

6. A microorganism culture producing means, comprising: a porous microfilter membrane having an upper surface adapted to retain microorganisms; a lamination of absorbent members, each of said members being impregnated with a different microorganism growth controlling substance soluble in water; said lamination of absorbent members adapted to be wetted and placed in wetting contact with the side of said microfilter opposite said microorganisms, whereby said substances are supplied in sequence to said microorganisms; at least one of said absorbent members being impregnated in different regions with different growth controlling substances and said microfilter membrane and lamination of absorbent members being anisotropic whereby microorganisms in corresponding regions of said microfilter membrane are differently affected.

7. A microorganism culture producing means as set forth in claim 4, wherein: said microfilter membrane forms the bottom of a first cup member and said absorbent members are disposed in the bottom of a second cup member, the cup members being so proportioned that on nesting the first cup member into the second cup member said microfilter membrane and absorbent members are brought into wetting contact; a plurality of said cup members adapted to be stacked alternately whereby the second cup members nest partially into said first cup members to establish an atmospheric region of predetermined volume.

8. A microorganism culture producing means as set forth in claim 6, wherein: said microfilter membrane forms the bottom of a first cup member and said absorbent members are disposed in the bottom of a second cup member, the cup members being so proportioned that on nesting the first cup member into the second cup member said microfilter membrane and absorbent members are brought into wetting contact; a plurality of said cup members adapted to be stacked alternately whereby the second cup members nest partially into said first cup members to establish an atmospheric region of predetermined volume.

9. A microorganism culture producing means, comprising: an anisotropic microfilter membrane adapted to collect microorganisms on a surface thereof; and a laminated pad including a lamination containing an initially dehydrated nutrient and an anisotropic lamination containing a plurality of substances in separate regions thereof, said substances being selected for various effects on microorganism growth, said pad adapted to be wetted and placed in wetting contact with said microfilter to cause anisotropic migration of said substances to corresponding areas of said microfilter.

10. A microorganism culture producing means for supplying soluble substances to microorganisms collected on the surface of an anisotropic microfilter, comprising: a laminated pad of porous material, at least one of said laminations being anisotropic and carrying a plurality of soluble substances calculated to have different effects on microorganisms; another of said laminations containing a nutrient substance; said pad adapted when wetted and placed in wetting contact with said microfilter to supply said substances to said microorganisms in accordance with a predetermined time schedule.

11. A microorganism culture producing means for supplying soluble substances to microorganisms collected on the surface of an anisotropic microfilter, comprising: a laminated pad, the various laminations containing different dehydrated substances calculated to effect the growth of microorganisms, said pad adapted when wetted and placed in wetting contact with said microfilter to supply said substances to said microorganisms in timed sequence.

12. A microorganism culture producing means, comprising: a microfilter having a dark light-absorbing upper surface adapted to collect microorganisms; a pad impregnated with dehydrated soluble substances calculated to affect said microorganisms, and adapted to be supplied thereto through said microfilter when said pad is wetted and placed in wetting contact with the underside of said microfilter; and means for detecting said microorganisms as they develop on the surface, including a light source directed at low angles across the upper surface of said microfilter.

13. A method of producing cultures of microorganisms, characterized by: collecting microorganisms on one surface of a filter membrane; and supplying in predetermined timed sequence through said filter membrane from the opposite side thereof a series of soluble substances calculated to affect the development of cultures of said microorganisms.

14. A method of producing cultures of microorganisms, characterized by: collecting microorganisms on one surface of a filter membrane; and supplying through different areas of said filter membrane from the opposite side thereof simultaneously a plurality of soluble substances calculated to affect the development of cultures of said microorganisms present in corresponding areas of said filter membrane.

15. A microorganism culture producing means as set forth in claim 4, wherein: said lamination of absorbent members comprises two laminae, the lamina adjacent said microfilter being impregnated with a generally stimulating nutrient tending to promote growth of substantially all microorganisms retained on the microfilter, and said second lamina being impregnated with a substance tending relatively to inhibit certain classes of said microorganisms.

16. A microorganism culture producing means as set forth in claim 4, wherein: said lamination of absorbent members comprises at least two laminae, the lamina adjacent said microfilter being impregnated at least in part with a substance toxic to certain classes of said microorganisms, and the second lamina containing a nutrient.

17. A microorganism culture producing means as set forth in claim 4, wherein: at least one of said absorbent members is impregnated with a growth controlling substance encapsulated into a colloid whereby upon wetting of said absorbent member said substance is retained by said colloid for a predetermined time before being supplied to said microorganisms.

18. A microorganism culture producing means as set forth in claim 4, wherein: a moisture permeable colloidal film encapsulating a selected growth controlling substance is included in said lamination.

References Cited in the file of this patent

FOREIGN PATENTS 957,354 France ---------------- Feb. 17, 1950